United States Patent
Cai

(10) Patent No.: US 6,725,763 B2
(45) Date of Patent: Apr. 27, 2004

(54) DEVICE AND METHOD FOR MAKING COFFEE AND ESPRESSO DRINKS

(76) Inventor: Edward Z. Cai, 4767 NW. Jeanice Pl., Corvallis, OR (US) 97330

( * ) Notice: Subject to any disclaimer, the term of this patent is extended or adjusted under 35 U.S.C. 154(b) by 130 days.

(21) Appl. No.: 09/944,998

(22) Filed: Sep. 1, 2001

(65) Prior Publication Data

US 2003/0041739 A1 Mar. 6, 2003

(51) Int. Cl.⁷ .................................................. A47J 31/00
(52) U.S. Cl. ............................ 99/287; 99/297; 99/323.3
(58) Field of Search ....................... 99/287, 297, 323.3, 99/323, 317, 319, 279, 348; 210/466, 465, 473, 464, 468

(56) References Cited

U.S. PATENT DOCUMENTS

| | | | |
|---|---|---|---|
| 2,935,928 A | * 5/1960 | Keating et al. | ................ 99/287 |
| 4,134,492 A | 1/1979 | Lucas | |
| 4,158,329 A | 6/1979 | McKnight | |
| 4,721,835 A | * 1/1988 | Welker | ........................ 99/323.3 |
| 4,938,375 A | 7/1990 | Fantacone | |
| 4,999,109 A | 3/1991 | Sabre | |
| 5,168,140 A | 12/1992 | Welker | |
| 5,267,506 A | 12/1993 | Cai | |
| 5,638,740 A | 6/1997 | Cai | |
| 5,932,098 A | * 8/1999 | Ross | ........................ 210/464 |
| 6,168,816 B1 | 1/2001 | Hammond | |
| 6,263,781 B1 | 7/2001 | Calagui | |

* cited by examiner

Primary Examiner—Reginald L. Alexander

(57) ABSTRACT

Device and method for making beverage from flavor-containing materials comprises a body connected to a container for allowing the formation of a dispersion of flavor-containing materials in liquid and the extraction of the flavor-containing materials to produce a beverage, a porous filter connected to the body and having a first surface for contacting the dispersion, filtration openings for allowing the beverage in the dispersion to pass through but blocking the flavor-containing materials and a second surface in communication with a beverage outlet from which the beverage may be poured or drunk, and a cling-on chamber on the body adapted to form a vacuum therein to suck to the interior surface of the container, thereby allowing the container to be tilted to generate a liquid head to drive the beverage out of the container through the filtration openings. The device may further include a blending/mixing mechanism to stir or break the flavor-containing materials and liquid for generating a visually appealing crema layer on the dispersion and/or facilitating the extraction of the flavor-containing materials by the liquid, and a flow facilitator having a selective opening for increasing the beverage flow through the filtration openings and preventing the flavor-containing materials in the dispersion from getting out of the container in the event that the dispersion covers the selective opening under a liquid head or force.

39 Claims, 4 Drawing Sheets

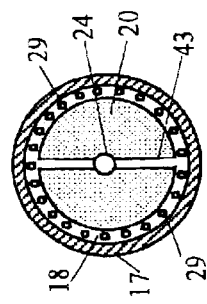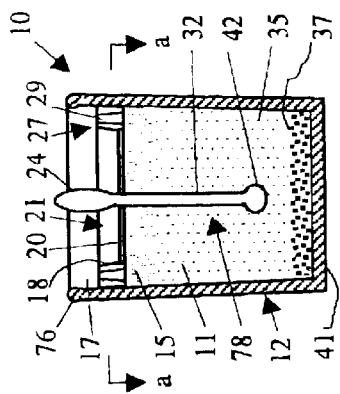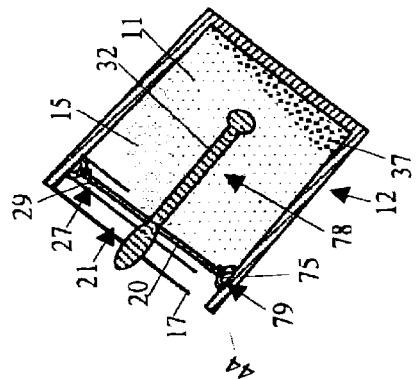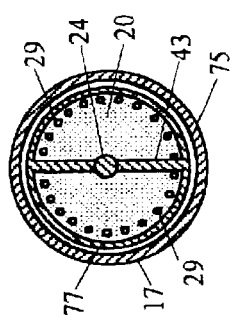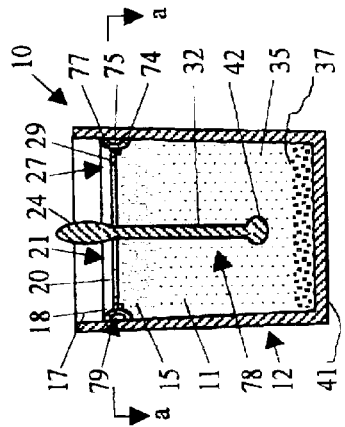

DEVICE AND METHOD FOR MAKING COFFEE AND ESPRESSO DRINKS

FIELD OF THE INVENTION

The invention relates to a device and method for making beverages such as coffee, espresso, latte, mocha, tea, fruit juice, cocoa or the like from flavor-containing materials, and particularly to a compact, easy to use and low-cost device and method for making better tasting beverages from flavor-containing materials.

BACKGROUND OF THE INVENTION

Beverages such as coffee and espresso drinks are commonly brewed by causing hot water to pass through the coffee grounds above a disposable or permanent filter either under gravity in case of manual or automatic drip coffee maker or under pressure in case of espresso machines.

Such devices, although popular, have numerous drawbacks such as inconsistent brew quality and lack of the original aroma in the roasted beans. The quality of coffee and espresso brewed varies significantly when coffee grounds of different sizes are used. When grounds is too coarse, the resulting brew is watery; when too fine, the brewing becomes very slow or even stops. The coffee or espresso brewed lacks the aroma or alluring smell of the ground coffee, even when it is made expensive commercial machines in premium coffee shops.

Other drawbacks include bulky size, complicated brewing process, high manufacturing cost, and time-consuming cleaning. Such devices normally take a space over four times larger than the volume of beverage they are designed to brew, which becomes an issue as the countertop or desktop becomes increasingly crowded. The brewing process, especially for espresso machines, involves many steps such as adding grounds to filter, mounting filter, filling water reservoir, heating and pumping water, placing cup or carafe under the basket, is too complex for some people. The manufacturing cost, especially for espresso machines, is very high since numerous components such as heater and pump, reservoir, a brew head, brew basket, basket holder, carafe, housing are required. Finally, such devices require a user to clean many parts such as filter basket, holders, carafe, brew head and cups, which, although not difficult, is a major nuance for many people.

The inventor in U.S. Pat. No. 5,638,740 provided a coffee and espresso device for making better tasting coffee and espresso by transforming the brewed beverage from coffee filter into a high-speed jet. The jet is arranged to inject into the coffee or espresso maintained in a containing means to generate a layer of visually crema in the cup. One issue with this improved device is that it still requires the delivery of liquid through the ground coffee, which increases the complexity, cost and size of the device.

SUMMARY OF THE INVENTION

The invention is an innovative simple device and method for making better beverages from flavor-containing materials. The device comprises a body for connecting to a container adapted to allow the formation of a dispersion of flavor-containing materials in a liquid and the extraction of the flavor-containing materials to produce a beverage, a porous filter connected to the body and having a first surface for contacting the dispersion, a plurality of filtration openings for allowing the beverage in the dispersion to pass through while blocking the flavor-containing materials and a second surface in communication with a beverage outlet from which the beverage may be poured or drunk, and a seal mechanism for securing the body to the container to allow the container to be tilted to generate a liquid head to drive the beverage out of the container through the filtration openings. In a preferable embodiment of the invention, the seal mechanism has a cling-on chamber on the body for forming a vacuum when being pushed into the container and then released to suck to the interior surface of the container. The device may further comprise a blending/mixing mechanism for stirring or breaking the flavor-containing materials and liquid in the container, thereby generating a visually appealing crema or foamy head on the dispersion and/or facilitating extraction of the flavor-containing materials by the liquid therein. The blending/mixing mechanism includes a plate, rod or blade operative either manually or by an electric motor. The device may further comprise a flow facilitator for increasing the flow of the beverage through the filtration openings. The facilitator has a selective opening adapted to allow air to enter the container to prevent the formation of vacuum but prevent or restrict the flavor-containing materials from getting out of the container in the event that the dispersion covers the selective opening under a liquid head or force, thereby ensuring that the beverage out of the container is free of the materials.

It is an object of the present invention to provide a device and method for making better tasting beverage from flavor-containing materials with a visually appealing top crema layer.

It is a further object of the present invention to provide a device and method for grounding, extracting and filtering the flavor-containing materials in the same container to capture all the aroma in the resulting beverage.

It is a further object of the present invention to provide a device and method that are simple, intuitive and has little or even no need to clean after usage.

It is a further object of the present invention to provide the most compact beverage device that is nearly as small as the volume of the beverage it brews at a time.

It is a further object of the present invention to provide a low cost beverage brewing device and a brewing device that can be affordable to be disposed after one use.

These and other objectives and advantages of the present invention will become apparent from the following description of the preferred embodiments, taken together with the accompanying drawings.

DESCRIPTION OF THE DRAWINGS

The accompanying drawing illustrates diagrammatically non-limitative embodiments of the invention, as follows:

FIG. 2 is a sectional view of a second embodiment of the beverage-making device;

FIG. 2a is a sectional view along line a—a shown in FIG. 2;

FIG. 3 is a sectional view of a third embodiment of the beverage-making device;

FIG. 3a is a sectional view along line a—a shown in FIG. 3;

FIG. 3b is a sectional view for the beverage-making device shown in FIG. 3 in a tilted position for discharging the beverage therein;

FIG. 5a is a sectional view of an alternative brew head assembly for the beverage device of FIG. 5;

DETAILED DESCRIPTION OF THE PREFERRED EMBODIMENTS

Figure 1B:
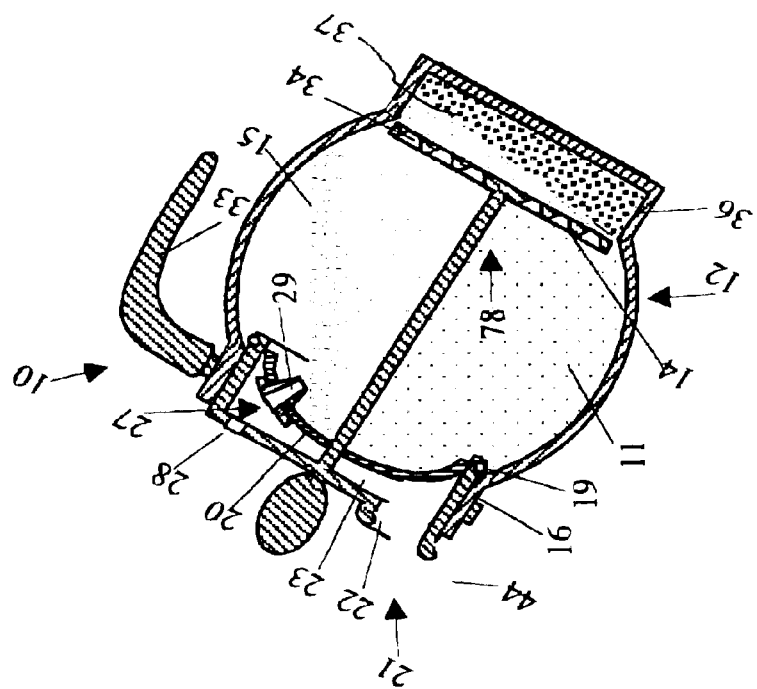
FIG. 1b is a sectional view for the beverage-making device shown in FIG. 1 in a tilted position for discharging the beverage therein.
Figure 1A:
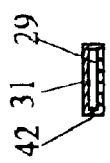
FIG. 1a is a sectional view for the flow facilitator along line a—a shown in FIG. 1.
Figure 1:
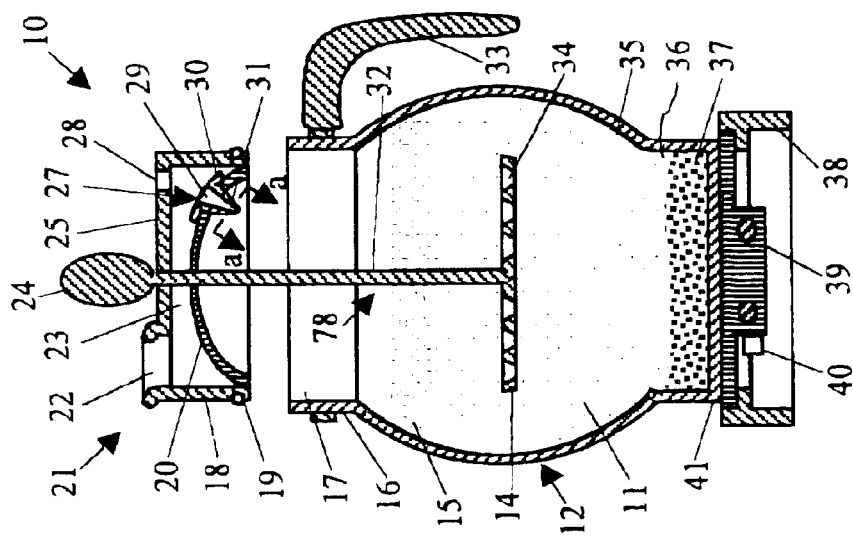
FIG. 1 is a sectional view of a first embodiment of a beverage-making device.

FIGS. 1, 1a and 1b shows certain parts of a device 10 for making beverages. Only those parts of the device are shown which are necessary for full understanding of the invention. Beverage device 10 comprises a container for receiving a supply of flavor-containing materials 37 and liquid and allowing the liquid to extract the flavor-containing materials therein, a heater assembly 39 supported by housing 38 and controlled by a thermal control means such as a thermostat 40 for heating the container and the content therein, and a brew head assembly 21 for facilitating the extraction of the flavor-containing materials and filtering the flavor-containing materials. The container 12 includes a top opening 17 for receiving the brew head assembly, a neck 16, a bottom 14, a bottom chamber 36 for the flavor-containing materials, a upper chamber 35 for the liquid and the resulting flavor-containing materials/liquid dispersion 11 and a top crema layer 15, and handle 33 for a user to hold and tilt the container to pour or drink the filtered beverage 44.

The assembly 21 comprises a body 18 for connecting to the top opening 17 of the container, a porous filter 20 attached to the lower end of the body having numerous filtration openings dimensioned to allow the beverage 44 to pass through but block the flavor-containing materials in the dispersion 11, a transient beverage chamber 23 for collecting the beverage from the porous filter, a blending/mixing mechanism 78 connected to the body 18 for producing the visually appealing top crema layer 15 on the dispersion 11, and a flow facilitator 27 located on the porous filter for increasing the flow of the liquid extraction or beverage 44 through said filtration openings and preventing the flavor-containing materials from getting out of the container in the event that the dispersion covers or reaches the selective opening under a liquid head or force. The body 18 has handle 24 for facilitating the handling of the brew head assembly, an o-ring 19 for forming a seal with the neck 18 of the container, a beverage outlet 22 from which the filtered beverage 44 is poured or drunk, a top cover 25 for the transient beverage chamber, and an vent 28 for venting the transient beverage chamber 23.

The blending/mixing mechanism 78 may perform one or several functions, including generating the crema or foam layer 15, mixing the flavor-containing materials and liquid, trapping the grounds in the bottom chamber 36 of the container, grinding the flavor-containing materials, and blending different ingredients for a beverage, as shown in this and later exemplar embodiments. The blending/mixing mechanism 78 in FIG. 1 comprises a plate member 14 and a rod 32 for connecting the plate member to the body 18. The plate member has a plurality of holes 34 for allowing the flavor-containing materials and fine air bubbles to pass through and minimizing the amount of flavor-containing materials that may be retained above the plate member. The holes 34 are tapered with the top opening larger than the bottom opening to facilitate the flavor-containing materials to pass through downwards when the plate member 14 is moved upward. The plate member 14 and rod 78 are dimensioned to allow the plate member to cover or partially cover the bottom chamber 36 to prevent or restrict the flavor-containing materials that precipitates from the dispersion 11 to the bottom chamber from being re-dispersed after the body 18 is connected to the container as shown in FIG. 1b. The extracted or partially extracted flavor-containing materials below the plate member 14 is heated or even "re-roasted" by the heater 39, causing additional flavor or/and aroma out of the flavor-containing materials.

It is found that by moving the plate member 14 up and down within the dispersion 11 in the container, a visually appealing crema layer 15 is generated on top of the dispersion. To display the crema layer 15 on top of the dispersion 11 produced by the blending/mixing mechanism, the porous filter 20, container 12 and/or the cover 25 may be transparent or translucent. It is also found that some porous filters, such as those filters made from polymeric materials that have similar refractive index as the liquid, become transparent or more transparent after being wetted by the liquid or the dispersion 11. It is also found, with much surprise, and will be described in details in FIGS. 2–3 that the plate member 14 may be replaced by a small ball 42 or even be removed to allow the rod 32 itself to function as the blending/mixing mechanism.

It is appreciated that the rod 32 can be slidingly mounted in an opening on the cover 25 to allow a user to move the rod 32 and the plate member 14 up and down within the container while the body 18 is mounted to the container (not shown). It is also appreciated that the plate member 14 may adopt other shapes such as an arc shape or a blade shape, which will be discussed in more detail in FIGS. 6a and 7.

The flow facilitator 27 functions not only to increase the beverage flow rate through the filtration openings of the porous filter 20 by allowing air to enter the container 12 to prevent the formation of vacuum therein, but also to prevent or restrict the flavor-containing materials in the dispersion 11 from getting out in the event that the flow facilitator is covered by the dispersion 11 under pressure or a liquid head. Therefore, the users or consumers are always ensured that that no flavor-containing materials, which can be unpleasant when present in the beverage to be drunk, will get out of the container 11 when the body 18 is mounted to the container. The flow facilitator can be a check valve as exemplified in FIGS. 1 and 5a and be a plurality of quasi-filtration openings as exemplified in FIGS. 2–7. In all examples, the flow facilitator has a selective opening 29 adapted to allow air to enter container 11, but to prevent or restrict the flavor-containing materials in the dispersion 11 from getting out of the container.

The facilitator 27 of FIG. 1 is a check valve comprises a base 30 for attaching the check valve to the porous filter 20 and the selective opening 29 inserted into a sufficiently large opening formed on the porous filter at a location farthest from beverage outlet 22. It is, however, appreciated that facilitator 27 can be located at other locations on porous filter 20 or on the body 18 or container 12. The selective opening 29 comprises two resilient elongated walls 31 and two resilient connection walls 42 for connecting the two elongated resilient walls 31. The connection walls are wider near the base 30 and become narrower when approaching the lower end of the valve. This design makes selective opening 29 decrease in size from the base to its lower end and become small enough or even closed at the lower end to prevent the flavor-containing materials in the dispersion 11 from passing through. The lower end of the selective opening becomes larger when the container 12 is tilted to generate a liquid head between the upper level of the dispersion 11 inside the container and the level of the beverage 44 at the beverage outlet 22, therefore allowing air to enter the container to take the space vacated by the beverage leaving the container through the porous filter 20. It was found that the lower end of the selective opening 29 stays small or closed when the dispersion 11 reaches over or covers the elongated walls 31 and when the container is tilted in the non-intended directions.

It is appreciated that a vent comprising a large opening that can allow air, the dispersion and the flavor-containing materials to pass through may be used to replace the flow facilitator 27 for increasing the filtration flow if it is acceptable to have some flavor-containing materials in the beverage or the vent can be so located that the dispersion 11 can not reach it during normal use. Such a vent can be located on a particular area of the container 11 or body 18. It is also appreciated that such a vent can be attached to the porous filter 20 or formed directly on the porous filter to reduce the complexity and cost of the beverage device.

The heater 39 may be permanently attached or removably engaged to the container 12 to conduct heat to the liquid and flavor-containing materials. The thermal control means may be selected to turn off the heater when or before the liquid reaches its boiling temperature to prevent overflow of the dispersion 11 in the container and reduce the deterioration of the flavor or aroma in the beverage prepared by the device. The flavor-containing materials may be extracted by directly adding hot liquid into the container.

In this and other exemplar embodiments, the container 12 can be made from metal such as stainless steel or aluminum, ceramic or porcelain, glass, paper, plastic foam or plastic materials or any combination of such materials. If the container is intended to contact or in heat-conducting relation with a gas or electric heater for heating the liquid and flavor-containing materials therein, it is preferred to use more heat conductive materials (metal, etc.) as at least the bottom of the container to increase the nucleation centers for steam bubbles thereon, thus reducing or preventing potential overflow of the dispersion 11 when heated. The container can be a carafe, pot, jar, can, bottle, pitcher, thermos, cup or any other vessel that can contain liquid. The porous filter 20 can be a cloth, screen, wire-mesh, woven, non-woven, expanded plastic, etched, punctured or injection molded filter and be made from plastic, metal, glass or elastomer. The liquid can be hot or cold water, milk, alcoholic drinks, soft drinks, fruit juices or any other liquid that can extract flavor or aroma from the flavor-containing materials 37. The flavor-containing materials can be coffee grounds, tea, coca, chocolate powder, milk powder, herb, fruit, meat, vegetables, grains, any combination, or any other materials which contains flavor or aroma. The beverage made by the device can be coffee, espresso, latte, mocha, tea, iced drinks, hot chocolate, blended drinks, fruit juices or any other edible fluids.

To use the beverage device 10 of FIG. 1 to make coffee or espresso, a desired amount of liquid is added into the container 12 and heated by the heater 39 to a predetermined temperature. A desired amount of ground coffee is then added to the hot liquid. Normally, at least some of the ground coffee, although soaked in the liquid, remains on the surface of the liquid. To generate a visually appealing layer of crema, the user simply repetitively moves the plate member 14 up and down in the container by holding the handle 24 or the body 18. Also as a result of such movement, the ground coffee become better dispersed in the container and the coarser ground coffee becomes precipitated to the bottom 41 of the container. The user then inserts the body 18 of the brew head assembly 21 into the opening 17, which result in a water-tight seal between the neck 16 of the container and the o-ring 19 on the body and the trapping of the coffee grounds in the bottom chamber 36 by the plate member 14. To pour coffee or to drink the coffee directly from the beverage outlet 22, the user simply tilts the container when holding the handler 33. The tilting causes a liquid head between the top level of the dispersion 11 and the beverage level at the beverage outlet 22 or the transient beverage chamber 23. The liquid head drives the beverage part of the dispersion 11 out of the container through the filtration openings of the porous filter 20. The selective opening 29 of the flow facilitator 27 opens up to allow air to enter the container 12 to prevent vacuum formation therein as the beverage exits the container, therefore facilitating the filtration flow through the porous filter.

If the crema layer 15 is not desired, the user may omit the step of moving the plate member 14 up and down in the container, thus simplifying the brewing process. It is appreciated that the ground coffee can be added into the container 12 any time, either before or after the water is added or heated. It is also appreciated hot or boiling water can be poured into the container and the ground coffee therein to avoid the need to heat the container, which makes it possible to use less heat resistant materials such as paper, foamed plastics or plastics for the container to lower the container cost. To make milk-containing coffee beverages such as latte and cappuccino, water/milk or milk alone is added to the container instead of water. Powdered milk, cocoa and/or chocolate can be added to the container to make milk and chocolate-containing coffee or espresso drinks. To make iced beverages, ice can be added, and may be broken by the blending/mixing mechanism 78, after the extraction has been completed. Other flavoring liquid or solid such as wine, syrups, cinema oil, fruits or fruit juices may also be added.

In the exemplar embodiment described in FIGS. 2 and 2a, an alternative blending/mixing mechanism 78 and an alternative flow facilitator 27 are provided for the brew head assembly 21. In the alternative blending/mixing mechanism 78, a small ball 42 is located at the end of the rod 32 to replace the plate member 14 of FIG. 1. To use the alternative blending/mixing mechanism, the user holds the handle 24 to insert the ball 42 and part of the rod 32 into the liquid and move the rod and ball in a substantially circular motion, which causes a layer of crema 15 to be formed on top of the dispersion 11 and some coarser ground coffee to precipitate to the bottom of the container 12. The user then mounts the assembly to the opening 17 of the container by inserting the body 18 into the container and forming a friction fit between the body 18 and the interior surface of the container to prevent the brew head assembly from being pushed out by the dispersion when the container is tilted. The lip 76 of the opening 17 of the container may protrude a little inwardly to prevent the body 18 from being pushed out by the dispersion 11 when the container 12 is tilted to generate a liquid head to drive the beverage out of the container through the porous filter 20. Here, the opening 17 of the container functions as the beverage outlet from which the beverage is poured or drunk.

In this alternative flow facilitator 27, the selective openings 29 comprise quasi filtration openings which are substantially cylindrical in shape and have larger size than the filtration openings of the porous filter 20. It is, however, appreciated that the quasi filtration openings can adopt square, rectangle, oval or other suitable shape. The cylindrical quasi filtration openings have significantly longer flow path, thus significantly higher flow resistance, for the beverage than the filtration openings of the porous filter, which, in combination with the few number of quasi filtration openings, makes the amount of beverage through the quasi filtration openings negligible compared to the amount of beverage through the filtration openings of the porous filter despite the larger size of the quasi filtration openings. As a result, even if the quasi filtration openings allow some fine particles or flavor-containing materials to pass through, the amount is sufficiently small that the quality of the resulting beverage will not be measurably deteriorated.

To prevent the quasi filtration openings from being blocked by the liquid or beverage that may stay in the quasi filtration openings due to capillary force, the quasi filtration openings are so dimensioned that a very small vacuum in the container is sufficient to pull the liquid in the openings back into container to clear up the quasi filtration openings for air to pass through. The vacuum or pressure at which the liquid in the quasi filtration openings is pulled or pushed back into the container is referred as the liquid breakthrough pressure in this application. It was found that the liquid breakthrough pressure depends on the size and shape of the quasi filtration openings, the material used to construct the quasi filtration openings and the surface tension of the liquid and the dispersion 11. Sufficiently low liquid breakthrough pressure for the quasi filtration openings is critical for achieving sufficiently high beverage flow rate through the filtration openings of the porous filter when the container is tilted to generate the liquid head. The liquid breakthrough pressure for the quasi filtration openings is preferred to be less than about two inches of liquid head, and is more preferred to be less than one inch of liquid head. It is appreciated that too low a liquid breakthrough pressure normally requires the quasi filtration opening to have relatively large size, which may allow unacceptably large flavor-containing materials to pass through, while too high a liquid breakthrough pressure may cause too much beverage left in the container at the end of the brewing or require the liquid head generated by the tilting of the container 12 to be sufficiently high to clear up the quasi filtration openings for air flow.

To facilitate the flavor-containing materials trapped in the quasi filtration opening to be pulled back into the container, the quasi filtration opening is slightly tapered with the lower end slightly larger than the upper end. To enable the flow facilitator 27 to function properly when the container 12 is tilted toward different directions, a plurality of the quasi filtration openings are formed around the periphery of the body 18. To reduce the cost, the body 18, porous filter 20, flow facilitator 27 and the blending/mixing mechanism 78 can be made as one part by injection molding or other suitable method.

In the exemplar embodiment described FIGS. 3–3b, another alternative flow facilitator 27 is provided. Unlike the alternative flow facilitator of FIG. 2, here the quasi filtration openings 29 are formed directly around and near the outer periphery of the porous filter. The quasi filtration openings may be formed at the same time the porous filter is made or may be formed afterwards by manufacturing means such punching, melting, mechanically or laser drilling, or etching. Since here the length of liquid flow path through the quasi filtration openings 29 is about the same as that through the filtration openings in the porous filter 20, the quasi filtration openings may be smaller in size than those in FIG. 2 to reduce the amount of the flavor-containing materials may pass through the quasi filtration openings, thus preventing any measurable deterioration in beverage quality or taste. It was found that by having the quasi filtration openings sufficiently hydrophobic, the quasi filtration openings stay sufficient dry when they are contacted by the liquid or dispersion in the container. Such hydrophobic quasi filtration openings repels the liquid but let air pass through relatively freely, therefore may have smaller size than the liquid-wettable quasi filtration openings and even than the filtration openings of the porous filter 20. It is appreciated that the quasi filtration openings 29, either hydrophobic or liquid wettable, can be formed in a separate entity and later attached to porous filter 20, making it possible for the quasi filtration openings to have longer flow path than the filtration openings of the porous filter 20.

To prevent the body 18 from being pushed out by the dispersion 11 when the container is tilted to generate the liquid head (FIG. 3b), a cling-on chamber 79 is formed around the periphery of the body 18 to secure the body to the interior surface of the container 12. The cling-on chamber comprises an upper chamber wall 77, a lower chamber wall 74 and a chamber opening 75 between the upper and lower walls. The upper and lower walls 74 and 77 are made of resilient materials and conform to the interior surface of the container to form an air-tight seal to close the opening 75, thus closing the chamber 79. To generate a vacuum in the cling-on chamber when mounting the body 18 to the container, the upper and lower chamber walls are adapted, such as being sufficiently tall and resilient, to allow the cling-on chamber 79 to decrease in volume, thus expelling the air therein, when a user holds the handle 24 to push the body 18 downwards into the container and then to increase in volume, thus causing a vacuum in the cling-on chamber, after the user releases the handle. The container can be slightly tapered to facilitate the insertion of the body 18 and the creation of the vacuum in the cling-on chamber. The vacuum generated in the cling-on chamber 79 causes the chamber to suck to the interior surface of the container.

It is appreciated that the cling-on chamber 79 may be divided into a plurality of short cling-on chambers that are separate from each other so that the loss of vacuum in one short cling-on chamber will not cause vacuum loss in the other short cling-on chambers. It is also appreciated that the cling-on chamber 79 may be replaced by one or more suction cups connected to the periphery of the body 18. It is also appreciated that the upper and lower chamber walls 74 and 77 can cling onto the interior surface of the container 12 even when no vacuum is formed in the cling-on chamber 79, thus not requiring any air-tight seal between the upper/lower chamber walls and the interior surface of the container. Here, the cling-on force may not be as high as if a vacuum is formed in the cling-on chamber.

Figure 4A:
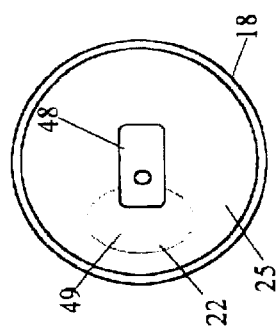
FIG. 4a is a top view of the beverage-making device of FIG. 4.
Figure 4:
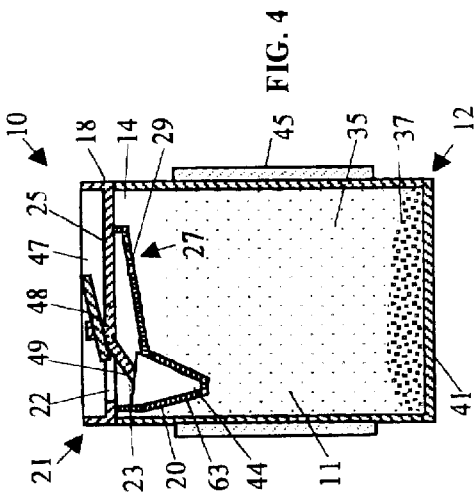
FIG. 4 is a sectional view of a forth embodiment of the beverage-making device.

In the exemplar embodiment described FIGS. 4 and 4a, the body 18 is irremovably attached to the container 12 to allow the cover 25 of the body 18 to seal the container and prevent the freshness loss of the flavor-containing materials in the container. A breakable or removable section 49 of the cover 25 is located near the left side of the container and a lever means 48, which is similar to that in the aluminum cans for soft drinks, is located above the breakable section to allow a user to pull the lever to break or remove the breakable section 49 and to form the beverage outlet 22. FIG. 4 shows the beverage device 10 after the breakable section 49 is broken by the lever means 48 and after hot water is added into the container through the beverage inlet 22 and through the porous filter 20 to extract the flavor-containing materials 37 in the container.

The flow facilitator 29 is formed on the porous filter by punching, melting or drilling a plurality of quasi filtration openings similar to those described in FIG. 3. It is preferably that the flow facilitator 29 is located at a location farther away from the breakable section 49 to better facilitate the filtration flow through the filtration openings of the porous filter when the container is tilted to generate a liquid head.

In addition to those functions described earlier, the flow facilitator 29 here allows air to get out of the container through the quasi filtration openings 27 when hot water is poured onto the porous filter to facilitate the filtration flow of the hot water into the container 12. It is also found that the flow rate through the filtration openings of the porous filter 20 can be further increased by shaking the container or repetitively tilting the container backward and forward. The flow facilitator prevents the flavor-containing materials in the dispersion 11 from passing through, thus from contaminating the beverage 44 from the filtration openings of the porous filter during the shaking or repetitive backward/forward tilting. It is believed that the shaking or repetitive backward/forward tilting causes the floated flavor-containing materials to precipitate to the bottom of the container and causes the dispersion 11 to reach and wash away the flavor-containing materials accumulated on the lower surface of the porous filter 20 during the filtration.

The porous filter 20 is attached to the lower surface of the cover 25 of body 18. A dip-in chamber 63 is formed on the porous filter to cause the filtration of the dispersion 11 through the porous filter before the container is tilted, therefore making an amount of beverage 44 available in the dip-in chamber. A heat insulation member such as a sleeve 45 made from paper, foam or other insulation materials is attached, either removably or permanently, to the outside of container 12 to prevent the hot liquid in the container from hurting the user when holding the container. It is appreciated that the porous filter can be attached to the top opening 14 of the container 12.

Figure 5:
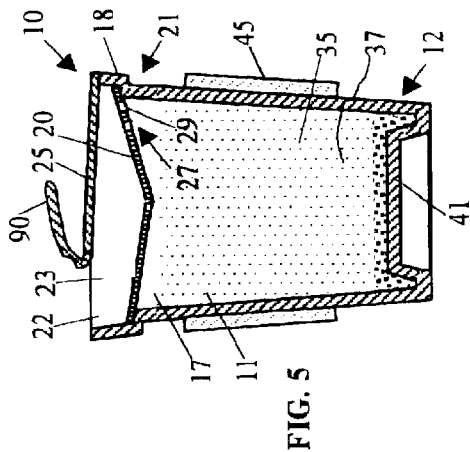
FIG. 5 is a sectional view of a fifth embodiment of the beverage-making device.

In the exemplar embodiment described FIG. 5, the body 18 and container 12 are formed together as one part with the bottom end of the body 18 connected to the top end of the opening 17 of the container. The porous filter 20 is attached to the bottom end of the body 18 to seal a supply of flavor-containing materials in the container. The flow facilitator 29 in this exemplar embodiment is the same and performs similar functions as the flow facilitator of FIG. 4. The cover 25 is removably attached to body 18 to prevent the freshness loss of the flavor-containing materials in the container.

To use the device 10, the cover 25 is partially removed to create a large enough opening as the beverage outlet and to allow hot water to be poured onto the porous filter as shown in FIG. 5. The cover can also be completely removed if desired. The hot water is poured onto the porous filter 20 and subsequently flows through the porous filter into the container to extract the flavor-containing materials 37 therein as the air leaves the container through the quasi filtration openings 29 of the flow facilitator 27. With the assistance of the facilitator 27, a user may further increase the flow rate of the beverage through porous filter 20 by shaking or repetitively tilting the container in the same as described in FIG. 4.

Figure 6A:
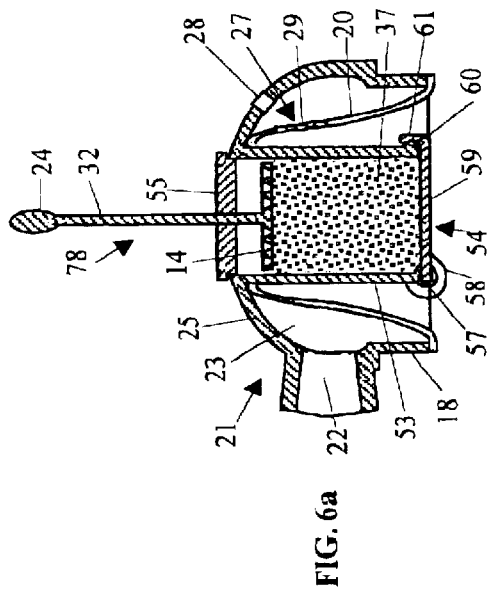
FIGS. 6a–c are partially sectional, partially schematic views of two alternative brew head assembly for the beverage-making device of FIG. 1.
Figure 6B:
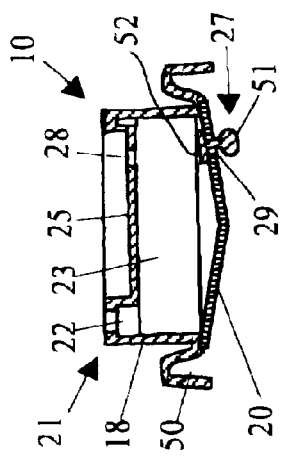
Figure 6C:
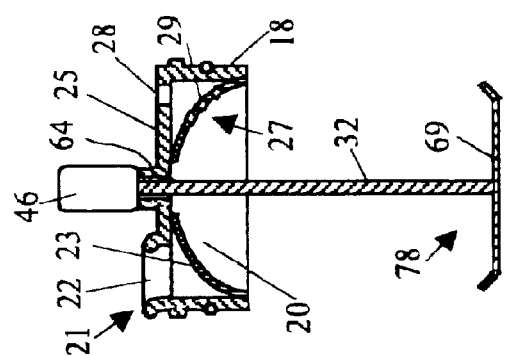

In FIGS. 6a–c, three alternative brew head assemblies 21 are described for the container 12 of FIGS. 1–3. In the brew head assembly of FIG. 6a, a transient storage chamber 54 is connected to the lower surface of the cover 25 for storing a supply of flavor-containing materials. The porous filter 20 adopts a tapered cylindrical shape with its larger low peripheral edge attached to the lower end of the body 18 and its smaller top peripheral edge attached to the lower surface of the cover 25. The storage chamber comprises a cylindrical wall 53, a feed opening 56, a lid 55 for closing the feed opening, and a bottom plate 59 connected to the cylindrical wall 53 by hinge means 57. The bottom plate has a tab 61 at the opposite side of the hinge means for engaging with an outward protrusion 60 formed at the lower end of the cylindrical wall 53 to enable the bottom plate to close the storage chamber. A spring 58 with one end connected to bottom plate 59 and the other end to cylindrical wall 53 is loaded to facilitate the opening of the bottom plate after tab 61 is disengaged from protrusion 60.

The flow facilitator 27 in this alternative brew head assembly is the same as that of FIGS. 4 and 5. The blending/mixing mechanism 78 is similar to that of FIG. 1, but is slidingly engaged to an opening 81 at the center of the lid 55. In one design, the bottom plate 59 is opened manually by pushing the handle 24 downwards, which in turn pushes the rod 32, plate member 14 and the ground coffee 37 in the storage chamber 54 downwards, to disengage the tab 61 from the outward protrusion 60. In another design, the bottom plate 59 is opened automatically when the temperature around it or in the container 12 becomes sufficiently high to cause the bottom plate to expand thermally to disengage the tab 61 from the protrusion 60.

In the brew head assembly of FIG. 6b, the body 18 is formed from one sheet of formable materials such as polyester, polyolefin, polystyrene or polyacrylics by thermal or mechanical means to achieve very low cost. A thin chamber 50 is formed around body 18 to seal to the rim or top wall of container 12. The filter 20 can be a low cost cloth, paper, woven or non-woven polymer filter attachable to body 18. The flow facilitator is a check valve with the selective opening 29 formed on the porous filter, a seal member 51 for closing the selective opening when the dispersion reaches the facilitator and a keeper 52 for keeping the seal member below the selective opening. To achieve lower cost, this facilitator may be replaced by the facilitator of FIG. 5. With such low cost brew head assembly and a disposable cup as the container, the device 10, such as a coffeemaker or espresso machine, for making 1–8 cups of coffee or espresso can be manufactured at a cost of $0.1 to $0.2.

In the alternative brew head assembly of FIG. 6c, the blending/mixing mechanism 78 comprises a blade 69, an electric motor 46 mounted to the cover 25 of body 18, and rod 32 for connecting the motor to the blade through an opening 64 on the cover 25 and for transmitting the force or torque from the motor to the blade. The blade 69 may function to generate the top crema layer 15 on the dispersion 11, to mix the liquid with the flavor-containing materials, to grind the flavor-containing materials such as roasted coffee beans in the container, to break ice and flavor-containing materials, to blend flavor-containing materials and/or liquid to make various beverages, etc. The flow facilitator 27 and porous filter 20 are similar to their counterparts in FIG. 6a.

Figure 7:
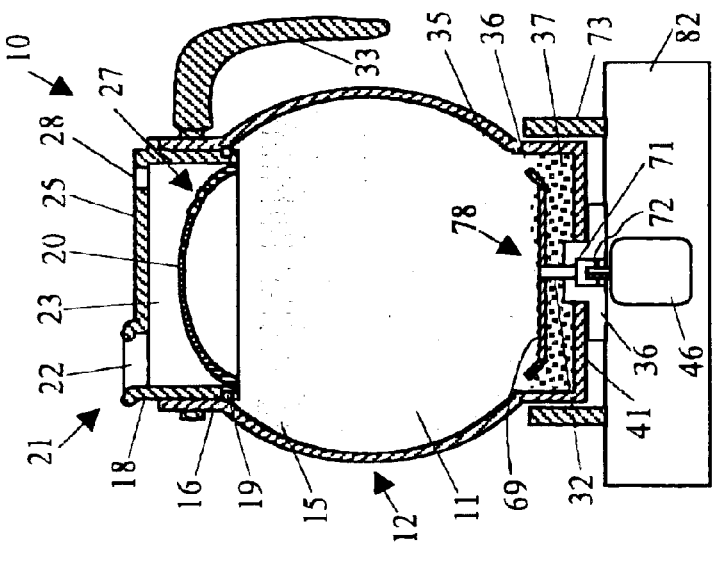
FIG. 7 is a partially sectional, partially schematic view of a sixth embodiment of the beverage device.

In FIG. 7, another exemplar embodiment of the invention is shown. The brew head assembly of FIG. 7 is similar to that of FIG. 6c except that the electric motor 46 of the blending/mixing mechanism 78 is mounted to a motor base 82 below container 12 and the blade 69 and rod 62 are rotationally connected to a container base 36 sealed to the bottom of the container. The rod 32 has a cavity 71 for engaging with shaft 72 of the motor when the container is removably received in cylindrical chamber 37 on motor base 82. A heater may be located in the base 36 or 82 to heat the container and the contents therein. Like the blending/mixing mechanism 78 of FIG. 6c, the blending/mixing mechanism here enables the device 10 to make all the drinks that can be made by coffee makers, espresso machines, blenders and mixers.

The scope of the invention is obviously not restricted or limited to the embodiments described by way of examples and depicted in the drawings, there being numerous changes, modifications, additions, and applications thereof imaginable within the purview of the claims.

What is claimed is:

1. A device for making beverage from flavor-containing materials comprising:

a body removably mountable to a container, which container is adapted to receive an amount of flavor-containing materials and liquid and to allow the formation of a dispersion of flavor-containing materials in liquid and the extraction of the flavor-containing materials by liquid to produce a liquid extraction or beverage;

a porous filter connected to said body, said porous filter comprising a first surface adapted to face or contact the dispersion in the container, a plurality of filtration openings adapted to allow the liquid extraction or beverage in the dispersion to pass through while blocking all or substantially all flavor-containing materials in the container, and a second surface in communication with a beverage outlet from which the liquid extraction or beverage may be poured or drunk;

a blending/mixing mechanism adapted to stir or break the flavor-containing materials and liquid in the container, thereby facilitating the extraction of the flavor-containing materials by the liquid in the container, said blending/mixing mechanism and said porous filter and body being configured to allow the container to be tilted to generate a liquid head to drive the liquid extraction or beverage out of the container through said filtration openings; and a cling-on chamber for maintaining said body in its mounted position when the container is tilted to generate the liquid head, said cling-on chamber having an upper chamber wall, a lower chamber wall and a chamber opening between said walls, said upper and lower chamber walls being adapted to cling on to the interior surface of the container, wherein said cling-on chamber is adapted to allow formation of a vacuum therein when being pushed downward or towards the interior surface of the container and then released.

2. A device for making beverage from flavor-containing materials comprising:

a body removably mountable to a container, which container is adapted to receive an amount of flavor-containing materials and liquid and to allow the formation of a dispersion of flavor-containing materials in liquid and the extraction of the flavor-containing materials by liquid to produce a liquid extraction or beverage;

a porous filter connected to said body, said porous filter comprising a first surface adapted to face or contact the dispersion in the container, a plurality of filtration openings adapted to allow the liquid extraction or beverage in the dispersion to pass through while blocking all or substantially all flavor-containing materials in the container, and a second surface in communication with a beverage outlet from which the liquid extraction or beverage may be poured or drunk; and a blending/mixing mechanism adapted to stir or break the flavor-containing materials and liquid in the container, thereby facilitating the extraction of the flavor-containing materials by the liquid in the container, said blending/mixing mechanism and said porous filter and body being configured to allow the container to be tilted to generate a liquid head to drive the liquid extraction or beverage out of the container through said filtration openings, wherein said blending/mixing mechanism comprises an electric motor, a rod having a first end adapted to receive force such as torque from said motor and a second end, and an blade adapted to grind, break, mix or blend connected to said rod at or near said second end.

3. Device as defined in claim 2 wherein said motor is mounted to one of said body and a base adapted to receive the container.

4. A device for making beverage from flavor-containing materials comprising:

a body removably mountable to a container, which container is adapted to receive an amount of flavor-containing materials and liquid and to allow the formation of a dispersion of flavor-containing materials in liquid and the extraction of the flavor-containing materials by liquid to produce a liquid extraction or beverage;

a porous filter connected to said body, said porous filter comprising a first surface adapted to face or contact the dispersion in the container, a plurality of filtration openings adapted to allow the liquid extraction or beverage in the dispersion to pass through while blocking all or substantially all flavor-containing materials in the container, and a second surface in communication with a beverage outlet from which the liquid extraction or beverage may be poured or drunk;

a blending/mixing mechanism adapted to stir or break the flavor-containing materials and liquid in the container, thereby facilitating the extraction of the flavor-containing materials by the liquid in the container, said blending/mixing mechanism and said porous filter and body being configured to allow the container to be tilted to generate a liquid head to drive the liquid extraction or beverage out of the container through said filtration openings; and a flow facilitator for increasing the flow of the beverage through said filtration openings, said facilitator comprising a selective opening adapted to allow air to enter the container to prevent the formation of vacuum therein but prevent or restrict the flavor-containing materials from getting out of the container in the event that the dispersion covers said selective opening under a liquid head or force, thereby ensuring that the beverage out of the container is always free or substantially free of the flavor-containing materials, wherein said flow facilitator comprises a check valve adapted to allow flow into the container but restrict or prevent the reverse flow.

5. A device for making beverage from flavor-containing materials comprising:

a body removably mountable to a container, which container is adapted to receive an amount of flavor-containing materials and liquid and to allow the formation of a dispersion of flavor-containing materials in liquid and the extraction of the flavor-containing materials by liquid to produce a liquid extraction or beverage;

a porous filter connected to said body, said porous filter comprising a first surface adapted to face or contact the dispersion in the container, a plurality of filtration openings adapted to allow the liquid extraction or beverage in the dispersion to pass through while blocking all or substantially all flavor-containing materials in the container, and a second surface in communication with a beverage outlet from which the liquid extraction or beverage may be poured or drunk;

a blending/mixing mechanism adapted to stir or break the flavor-containing materials and liquid in the container, thereby facilitating the extraction of the flavor-containing materials by the liquid in the container, said blending/mixing mechanism and said porous filter and body being configured to allow the container to be tilted to generate a liquid head to drive the liquid extraction or beverage out of the container through said filtration openings; and a flow facilitator for increasing the flow of the beverage through said filtration openings, said facilitator comprising a selective opening adapted to allow air to enter the container to prevent the formation of vacuum therein but prevent or restrict the flavor-containing materials from getting out of the container in the event that the dispersion covers said selective opening under a liquid head or force, thereby ensuring that the beverage out of the container is always free or substantially free of the flavor-containing materials, wherein said selective opening comprises a hydrophobic opening that is sufficiently hydrophobic to prevent the liquid or dispersion from wetting or passing through.

6. A device for making beverage from flavor-containing materials comprising:

a body removably mountable to a container, which container is adapted to receive an amount of flavor-containing materials and liquid and to allow the formation of a dispersion of flavor-containing materials in liquid and the extraction of the flavor-containing materials by liquid to produce a liquid extraction or beverage;

a porous filter connected to said body, said porous filter comprising a first surface adapted to face or contact the dispersion in the container, a plurality of filtration openings adapted to allow the liquid extraction or beverage in the dispersion to pass through while blocking all or substantially all flavor-containing materials in the container, and a second surface in communication with a beverage outlet from which the liquid extraction or beverage may be poured or drunk;

a blending/mixing mechanism adapted to stir or break the flavor-containing materials and liquid in the container, thereby facilitating the extraction of the flavor-containing materials by the liquid in the container, said blending/mixing mechanism and said porous filter and body being configured to allow the container to be tilted to generate a liquid head to drive the liquid extraction or beverage out of the container through said filtration openings; and a vent for venting the container during the use of said device to make beverage, wherein said vent is arranged on said porous filter.

7. A device for making beverage from flavor-containing materials comprising:

a body removably mountable to a container, which container is adapted to receive an amount of flavor-containing materials and liquid and to allow the formation of a dispersion of flavor-containing materials in liquid and the extraction of the flavor-containing materials by liquid to produce a liquid extraction or beverage;

a porous filter connected to said body, said porous filter comprising a first surface adapted to face or contact the dispersion in the container, a plurality of filtration openings adapted to allow the liquid extraction or beverage in the dispersion to pass through while blocking all or substantially all flavor-containing materials in the container, and a second surface in communication with a beverage outlet from which the liquid extraction or beverage may be poured or drunk; and a blending/mixing mechanism adapted to stir or break the flavor-containing materials and liquid in the container, thereby facilitating the extraction of the flavor-containing materials by the liquid in the container, said blending/mixing mechanism and said porous filter and body being configured to allow the container to be tilted to generate a liquid head to drive the liquid extraction or beverage out of the container through said filtration openings, wherein said porous filter is adapted to change shape or deform when disturbed by the motion of said body, the container or the liquid therein for facilitating the flavor-containing materials accumulated on said first surface to fall off into the container.

8. A device for making beverage from flavor-containing materials comprising:

a body removably mountable to a container, which container is adapted to receive an amount of flavor-containing materials and liquid and to allow the formation of a dispersion of flavor-containing materials in liquid and the extraction of the flavor-containing materials by liquid to produce a liquid extraction or beverage;

a porous filter connected to said body, said porous filter comprising a first surface adapted to face or contact the dispersion in the container, a plurality of filtration openings adapted to allow the liquid extraction or beverage in the dispersion to pass through while blocking all or substantially all flavor-containing materials in the container, and a second surface in communication with a beverage outlet from which the liquid extraction or beverage may be poured or drunk;

a blending/mixing mechanism adapted to stir or break the flavor-containing materials and liquid in the container, thereby facilitating the extraction of the flavor-containing materials by the liquid in the container, said blending/mixing mechanism and said porous filter and body being configured to allow the container to be tilted to generate a liquid head to drive the liquid extraction or beverage out of the container through said filtration openings; and a transient storage chamber for storing an amount of flavor-containing materials, said storage chamber having a feeding opening for the flavor-containing materials and a removable bottom plate operative between a first position, in which it closes said storage chamber, and a second position, in which it opens said storage chamber to cause the flavor-containing materials therein to fall into said container.

9. A device for making beverage from flavor-containing materials comprising:
- a body connected or for connecting to a container, which container is adapted to receive an amount of flavor-containing materials and an amount of liquid and to allow the extraction of the flavor-containing materials by liquid to produce a liquid extraction or beverage;
- a porous filter connected to said body, said porous filter comprising a first surface adapted to face or contact the flavor-containing materials and liquid in the container, a plurality of filtration openings adapted to allow the liquid extraction or beverage to pass through while blocking all or substantially all flavor-containing materials in the container and a second surface in communication with a beverage outlet from which the liquid extraction or beverage may be poured or drunk, said porous filter and said body being configured to allow the container to be tilted to generate a liquid head to drive the liquid extraction or beverage out of the container through said filtration openings;
- a flow facilitator for increasing the flow rate of the liquid extraction or beverage through said filtration openings, said flow facilitator comprising a selective opening adapted to allow air to enter the container to prevent the formation of vacuum therein but prevent or restrict the flavor-containing materials from getting out of the container in the event that the flavor-containing materials and liquid covers said selective opening under a liquid head or force, thereby ensuring that the beverage out of the container is always free or substantially free of the flavor-containing materials; and
- a blending/mixing mechanism for stirring or breaking the flavor-containing materials and liquid in the container,
- wherein said blending/mixing mechanism comprises an electric motor, a shaft having a first end adapted to receive force such as torque from said motor and a second end, and a blade connected to said shaft at or near said second end.

10. A device for making beverage from flavor-containing materials comprising:
- a body connected or for connecting to a container, which container is adapted to receive an amount of flavor-containing materials and an amount of liquid and to allow the extraction of the flavor-containing materials by liquid to produce a liquid extraction or beverage;
- a porous filter connected to said body, said porous filter comprising a first surface adapted to face or contact the flavor-containing materials and liquid in the container, a plurality of filtration openings adapted to allow the liquid extraction or beverage to pass through while blocking all or substantially all flavor-containing materials in the container and a second surface in communication with a beverage outlet from which the liquid extraction or beverage may be poured or drunk, said porous filter and said body being configured to allow the container to be tilted to generate a liquid head to drive the liquid extraction or beverage out of the container through said filtration openings; and
- a flow facilitator for increasing the flow rate of the liquid extraction or beverage through said filtration openings, said flow facilitator comprising a selective opening adapted to allow air to enter the container to prevent the formation of vacuum therein but prevent or restrict the flavor-containing materials from getting out of the container in the event that the flavor-containing materials and liquid covers said selective opening under a liquid head or force, thereby ensuring that the beverage out of the container is always free or substantially free of the flavor-containing materials,
- wherein said flow facilitator comprises a check valve adapted to allow flow into the container but restrict or prevent the reverse flow.

11. A device for making beverage from flavor-containing materials comprising:
- a body connected or for connecting to a container, which container is adapted to receive an amount of flavor-containing materials and an amount of liquid and to allow the extraction of the flavor-containing materials by liquid to produce a liquid extraction or beverage;
- a porous filter connected to said body, said porous filter comprising a first surface adapted to face or contact the flavor-containing materials and liquid in the container, a plurality of filtration openings adapted to allow the liquid extraction or beverage to pass through while blocking all or substantially all flavor-containing materials in the container and a second surface in communication with a beverage outlet from which the liquid extraction or beverage may be poured or drunk, said porous filter and said body being configured to allow the container to be tilted to generate a liquid head to drive the liquid extraction or beverage out of the container through said filtration openings; and
- a flow facilitator for increasing the flow rate of the liquid extraction or beverage through said filtration openings, said flow facilitator comprising a selective opening adapted to allow air to enter the container to prevent the formation of vacuum therein but prevent or restrict the flavor-containing materials from getting out of the container in the event that the flavor-containing materials and liquid covers said selective opening under a liquid head or force, thereby ensuring that the beverage out of the container is always free or substantially free of the flavor-containing materials,
- wherein said selective opening adopts a tapered shape to trap the flavor-containing materials and to allow a small vacuum in the container to pull the trapped flavor-containing materials back into the container.

12. A device for making beverage from flavor-containing materials comprising:
- a body connected or for connecting to a container, which container is adapted to receive an amount of flavor-containing materials and an amount of liquid and to allow the extraction of the flavor-containing materials by liquid to produce a liquid extraction or beverage;
- a porous filter connected to said body, said porous filter comprising a first surface adapted to face or contact the flavor-containing materials and liquid in the container, a plurality of filtration openings adapted to allow the liquid extraction or beverage to pass through while blocking all or substantially all flavor-containing materials in the container and a second surface in communication with a beverage outlet from which the liquid extraction or beverage may be poured or drunk, said porous filter and said body being configured to allow the container to be tilted to generate a liquid head to drive the liquid extraction or beverage out of the container through said filtration openings; and
- a flow facilitator for increasing the flow rate of the liquid extraction or beverage through said filtration openings, said flow facilitator comprising a selective opening adapted to allow air to enter the container to prevent the formation of vacuum therein but prevent or restrict the flavor-containing materials from getting out of the container in the event that the flavor-containing materials and liquid covers said selective opening under a liquid head or force, thereby ensuring that the beverage out of the container is always free or substantially free of the flavor-containing materials, wherein said selective opening comprises a hydrophobic opening that is sufficiently hydrophobic to prevent the liquid or dispersion from wetting or passing through.

13. A device for making beverage from flavor-containing materials comprising:

a body connected or for connecting to a container, which container is adapted to receive an amount of flavor-containing materials and an amount of liquid and to allow the extraction of the flavor-containing materials by liquid to produce a liquid extraction or beverage;

a porous filter connected to said body, said porous filter comprising a first surface adapted to face or contact the flavor-containing materials and liquid in the container, a plurality of filtration openings adapted to allow the liquid extraction or beverage to pass through while blocking all or substantially all flavor-containing materials in the container and a second surface in communication with a beverage outlet from which the liquid extraction or beverage may be poured or drunk, said porous filter and said body being configured to allow the container to be tilted to generate a liquid head to drive the liquid extraction or beverage out of the container through said filtration openings; and a flow facilitator for increasing the flow rate of the liquid extraction or beverage through said filtration openings, said flow facilitator comprising a selective opening adapted to allow air to enter the container to prevent the formation of vacuum therein but prevent or restrict the flavor-containing materials from getting out of the container in the event that the flavor-containing materials and liquid covers said selective opening under a liquid head or force, thereby ensuring that the beverage out of the container is always free or substantially free of the flavor-containing materials, wherein said flow facilitator is located on said porous filter.

14. A device for making beverage from flavor-containing materials comprising:

a body connected or for connecting to a container, which container is adapted to receive an amount of flavor-containing materials and an amount of liquid and to allow the extraction of the flavor-containing materials by liquid to produce a liquid extraction or beverage;

a porous filter connected to said body, said porous filter comprising a first surface adapted to face or contact the flavor-containing materials and liquid in the container, a plurality of filtration openings adapted to allow the liquid extraction or beverage to pass through while blocking all or substantially all flavor-containing materials in the container and a second surface in communication with a beverage outlet from which the liquid extraction or beverage may be poured or drunk, said porous filter and said body being configured to allow the container to be tilted to generate a liquid head to drive the liquid extraction or beverage out of the container through said filtration openings; and a flow facilitator for increasing the flow rate of the liquid extraction or beverage through said filtration openings, said flow facilitator comprising a selective opening adapted to allow air to enter the container to prevent the formation of vacuum therein but prevent or restrict the flavor-containing materials from getting out of the container in the event that the flavor-containing materials and liquid covers said selective opening under a liquid head or force, thereby ensuring that the beverage out of the container is always free or substantially free of the flavor-containing materials, wherein said porous filter is adapted to change shape or deform when disturbed by the motion of said body, the container or the liquid therein for facilitating the flavor-containing materials accumulated on said first surface to fall off into the container.

15. A device for making beverage from flavor-containing materials comprising:

a body connected or for connecting to a container, which container is adapted to receive an amount of flavor-containing materials and an amount of liquid and to allow the extraction of the flavor-containing materials by liquid to produce a liquid extraction or beverage;

a porous filter connected to said body, said porous filter comprising a first surface adapted to face or contact the flavor-containing materials and liquid in the container, a plurality of filtration openings adapted to allow the liquid extraction or beverage to pass through while blocking all or substantially all flavor-containing materials in the container and a second surface in communication with a beverage outlet from which the liquid extraction or beverage may be poured or drunk, said porous filter and said body being configured to allow the container to be tilted to generate a liquid head to drive the liquid extraction or beverage out of the container through said filtration openings;

a flow facilitator for increasing the flow rate of the liquid extraction or beverage through said filtration openings, said flow facilitator comprising a selective opening adapted to allow air to enter the container to prevent the formation of vacuum therein but prevent or restrict the flavor-containing materials from getting out of the container in the event that the flavor-containing materials and liquid covers said selective opening under a liquid head or force, thereby ensuring that the beverage out of the container is always free or substantially free of the flavor-containing materials; and a transient storage chamber for storing an amount of flavor-containing materials, said storage chamber having a feeding opening for the flavor-containing materials and a removable bottom plate operative between a first position, in which it closes said storage chamber, and a second position, in which it opens said storage chamber to cause the flavor-containing materials therein to fall into said container.

16. Device as defined in claim 15 wherein said removable bottom plate is adapted to be triggered automatically from said first position to second position after the temperature around it or in the container reaches a predetermined value.

17. A device for making beverage from flavor-containing materials comprising:

a body connected or for connecting to a container, which container is adapted to receive an amount of flavor-containing materials and an amount of liquid and to allow the extraction of the flavor-containing materials by liquid to produce a liquid extraction or beverage;

a porous filter connected to said body, said porous filter comprising a first surface adapted to face or contact the flavor-containing materials and liquid in the container, a plurality of filtration openings adapted to allow the liquid extraction or beverage to pass through while blocking all or substantially all flavor-containing materials in the container and a second surface in communication with a beverage outlet from which the liquid extraction or beverage may be poured or drunk, said porous filter and said body being configured to allow the container to be tilted to generate a liquid head to drive the liquid extraction or beverage out of the container through said filtration openings; and a flow facilitator for increasing the flow rate of the liquid extraction or beverage through said filtration openings, said flow facilitator comprising a selective opening adapted to allow air to enter the container to prevent the formation of vacuum therein but prevent or restrict the flavor-containing materials from getting out of the container in the event that the flavor-containing materials and liquid covers said selective opening under a liquid head or force, thereby ensuring that the beverage out of the container is always free or substantially free of the flavor-containing materials;

wherein said body is permanently connected to the container by means such as irremovably connecting said body or porous filter to the container or forming said body and the container together as one part.

18. Device as defined in claim 17 further comprising a heat insulation member for protecting the user from the heat conducted from hot fluid in said device.

19. Device as defined in claim 18 wherein said body and container are made from aluminum or alloy for facilitating the recyclability of said device.

20. Device as defined in claim 17 comprising a cover for preventing the loss of the freshness of flavor-containing materials in the container prior to the use of said device to make beverage, said cover being adapted to allow at least a section of said cover to be removable or breakable to allow the addition of hot liquid into the container to mix with and extract the flavor-containing materials therein.

21. Device as defined in claim 17 wherein said body and container are formed together as said one part from at least one of plastic, paper and glass materials.

22. Device as defined in claim 17 wherein said body is irremovably connected to the top end of the container, the container being one of a can, a cup and a bottle.

23. Device as defined in claim 17 wherein at least part of said porous filter is adapted to change shape or deform when disturbed by the motion of said body, the container or the liquid therein for facilitating the flavor-containing materials accumulated on said first surface to fall off into the container.

24. Device as defined in claim 17 further comprising a supply of flavor-containing materials in the container.

25. Method for using the device as defined in claim 24 comprising a step of pouring liquid through said porous filter into the container, a step of automatically releasing the gas out of the container through said flow facilitator as the liquid is being poured into the container, thereby preventing pressurization in the container, a step of tilting the container to generate a liquid head to drive the beverage out of the container through said porous filter, and a step of automatically drawing air through said flow facilitator into the container, thereby preventing vacuum formation in the container as the beverage is driven out of the container through said porous filter by said liquid head.

26. A device for making beverage from flavor-containing materials comprising:

a body connected or for connecting to a container, which container is adapted to receive an amount of flavor-containing materials and an amount of liquid and to allow the extraction of the flavor-containing materials by liquid to produce a liquid extraction or beverage;

a porous filter connected to said body, said porous filter comprising a first surface adapted to face or contact the flavor-containing materials and liquid in the container, a plurality of filtration openings adapted to allow the liquid extraction or beverage to pass through while blocking all or substantially all flavor-containing materials in the container and a second surface in communication with a beverage outlet from which the liquid extraction or beverage may be poured or drunk, said porous filter and said body being configured to allow the container to be tilted to generate a liquid head to drive the liquid extraction or beverage out of the container through said filtration openings;

a flow facilitator for increasing the flow rate of the liquid extraction or beverage through said filtration openings, said flow facilitator comprising a selective opening adapted to allow air to enter the container to prevent the formation of vacuum therein but prevent or restrict the flavor-containing materials from getting out of the container in the event that the flavor-containing materials and liquid covers said selective opening under a liquid head or force, thereby ensuring that the beverage out of the container is always free or substantially free of the flavor-containing materials; and a cling-on chamber for maintaining said body in its mounted position when the container is tilted to generate the liquid head, said cling-on chamber having an upper chamber wall, a lower chamber wall and a chamber opening between said walls, said walls being adapted to cling on to the interior surface of the container, wherein said cling-on chamber is adapted to allow the formation of a vacuum therein when being pushed downward or towards the interior surface of the container and then released.

27. A device for making beverage from flavor-containing materials comprising:

a body removably mountable to a container, which container is adapted to receive an amount of flavor-containing materials and liquid and to allow the extraction of the flavor-containing materials by liquid to produce a liquid extraction or beverage;

a porous filter connected to said body, said porous filter comprising a first surface adapted to face or contact the flavor-containing materials and liquid in the container, a plurality of filtration openings adapted to allow the liquid extraction or beverage to pass through but block all or substantially all flavor-containing materials in the container, and a second surface in communication with a beverage outlet from which the liquid extraction or beverage may be poured or drunk;

a cling-on chamber for maintaining said body in its mounted position when the container is tilted to generate a liquid head to drive the liquid extraction or beverage out of the container through said filtration openings, said cling-on chamber comprising an upper chamber wall, a lower chamber wall and a chamber opening between said upper and lower chamber walls, said upper and lower chamber walls being adapted to cling on to the interior surface of the container; and a blending/mixing mechanism for stirring or breaking the flavor-containing materials and liquid in the container, wherein said blending/mixing mechanism comprises an electric motor, a shaft having a first end adapted to receive force such as torque from said motor and a second end, and a blade connected to said shaft at or near said second end.

28. A device for making beverage from flavor-containing materials comprising:
    a body removably mountable to a container, which container is adapted to receive an amount of flavor-containing materials and liquid and to allow the extraction of the flavor-containing materials by liquid to produce a liquid extraction or beverage;
    a porous filter connected to said body, said porous filter comprising a first surface adapted to face or contact the flavor-containing materials and liquid in the container, a plurality of filtration openings adapted to allow the liquid extraction or beverage to pass through but block all or substantially all flavor-containing materials in the container, and a second surface in communication with a beverage outlet from which the liquid extraction or beverage may be poured or drunk; and
    a cling-on chamber for maintaining said body in its mounted position when the container is tilted to generate a liquid head to drive the liquid extraction or beverage out of the container through said filtration openings, said cling-on chamber comprising an upper chamber wall, a lower chamber wall and a chamber opening between said upper and lower chamber walls, said upper and lower chamber walls being adapted to cling on to the interior surface of the container,
    wherein said upper and lower chamber walls are configured to seal to the interior surface of the container to close said chamber opening and to allow the formation of a vacuum in said cling-on chamber, said vacuum causing said cling-on chamber sucked to the interior surface of the container.

29. A device for making beverage from flavor-containing materials comprising:
    a body removably mountable to a container, which container is adapted to receive an amount of flavor-containing materials and liquid and to allow the extraction of the flavor-containing materials by liquid to produce a liquid extraction or beverage;
    a porous filter connected to said body, said porous filter comprising a first surface adapted to face or contact the flavor-containing materials and liquid in the container, a plurality of filtration openings adapted to allow the liquid extraction or beverage to pass through but block all or substantially all flavor-containing materials in the container, and a second surface in communication with a beverage outlet from which the liquid extraction or beverage may be poured or drunk; and
    a cling-on chamber for maintaining said body in its mounted position when the container is tilted to generate a liquid head to drive the liquid extraction or beverage out of the container through said filtration openings, said cling-on chamber comprising an upper chamber wall, a lower chamber wall and a chamber opening between said upper and lower chamber walls, said upper and lower chamber walls being adapted to cling on to the interior surface of the container,
    wherein said cling-on chamber is adapted to form a vacuum when being pushed downward or towards the interior surface of the container and then released.

30. A device for making beverage from flavor-containing materials comprising:
    a body removably mountable to a container, which container is adapted to receive an amount of flavor-containing materials and liquid and to allow the extraction of the flavor-containing materials by liquid to produce a liquid extraction or beverage;
    a porous filter connected to said body, said porous filter comprising a first surface adapted to face or contact the flavor-containing materials and liquid in the container, a plurality of filtration openings adapted to allow the liquid extraction or beverage to pass through but block all or substantially all flavor-containing materials in the container, and a second surface in communication with a beverage outlet from which the liquid extraction or beverage may be poured or drunk; and
    a cling-on chamber for maintaining said body in its mounted position when the container is tilted to generate a liquid head to drive the liquid extraction or beverage out of the container through said filtration openings,
    wherein said cling-on chamber comprises a suction cup adapted to form a vacuum when being pushed downward or towards the interior surface of the container and then released.

31. A device for making beverage from flavor-containing materials comprising:
    a body removably mountable to a container, which container is adapted to receive an amount of flavor-containing materials and liquid and to allow the extraction of the flavor-containing materials by liquid to produce a liquid extraction or beverage;
    a porous filter connected to said body, said porous filter comprising a first surface adapted to face or contact the flavor-containing materials and liquid in the container, a plurality of filtration openings adapted to allow the liquid extraction or beverage to pass through but block all or substantially all flavor-containing materials in the container, and a second surface in communication with a beverage outlet from which the liquid extraction or beverage may be poured or drunk;
    a cling-on chamber for maintaining said body in its mounted position when the container is tilted to generate a liquid head to drive the liquid extraction or beverage out of the container through said filtration openings, said cling-on chamber comprising an upper chamber wall, a lower chamber wall and a chamber opening between said upper and lower chamber walls, said upper and lower chamber walls being adapted to cling on to the interior surface of the container; and
    a flow facilitator for increasing beverage flow through said filtration openings by allowing air to enter the container to prevent vacuum formation therein, said flow facilitator being adapted to prevent or restrict the flavor-containing materials in the container from passing through in the event that the dispersion reaches or covers said flow facilitator under a liquid head or force, thereby ensuring that the beverage out of the container is free or substantially free of the flavor-containing materials,
    wherein said flow facilitator comprises a check valve adapted to allow flow into the container but restrict or prevent the reverse flow.

32. A device for making beverage from flavor-containing materials comprising:
    a body removably mountable to a container, which container is adapted to receive an amount of flavor-containing materials and liquid and to allow the extraction of the flavor-containing materials by liquid to produce a liquid extraction or beverage;

a porous filter connected to said body, said porous filter comprising a first surface adapted to face or contact the flavor-containing materials and liquid in the container, a plurality of filtration openings adapted to allow the liquid extraction or beverage to pass through but block all or substantially all flavor-containing materials in the container, and a second surface in communication with a beverage outlet from which the liquid extraction or beverage may be poured or drunk;

a cling-on chamber for maintaining said body in its mounted position when the container is tilted to generate a liquid head to drive the liquid extraction or beverage out of the container through said filtration openings, said cling-on chamber comprising an upper chamber wall, a lower chamber wall and a chamber opening between said upper and lower chamber walls, said upper and lower chamber walls being adapted to cling on to the interior surface of the container; and a vent for venting the container during the use of said device to make beverage, said vent being arranged on said porous filter.

33. A device for making beverage from flavor-containing materials comprising:

a body removably mountable to a container, which container is adapted to receive an amount of flavor-containing materials and liquid and to allow the extraction of the flavor-containing materials by liquid to produce a liquid extraction or beverage;

a porous filter connected to said body, said porous filter comprising a first surface adapted to face or allow the liquid extraction or beverage to pass through but block all or substantially all flavor-containing materials in the container, and a second surface in communication with a beverage outlet from which the liquid extraction or beverage may be poured or drunk; and a cling-on chamber for maintaining said body in its mounted position when the container is tilted to generate a liquid head to drive the liquid extraction or beverage out of the container through said filtration openings, said cling-on chamber comprising an upper chamber wall, a lower chamber wall and a chamber opening between said upper and lower chamber walls, said upper and lower chamber walls being adapted to cling on to the interior surface of the container, wherein said porous filter is adapted to change shape or deform when disturbed by the motion of said body, the container or the liquid therein for facilitating the flavor-containing materials accumulated on said first surface to fall off into the container.

34. A device for making beverage from flavor-containing materials comprising:

a body removably mountable to a container, which container is adapted to receive an amount of flavor-containing materials and liquid and to allow the extraction of the flavor-containing materials by liquid to produce a liquid extraction or beverage;

a porous filter connected to said body, said porous filter comprising a first surface adapted to face or contact the flavor-containing materials and liquid in the container, a plurality of filtration openings adapted to allow the liquid extraction or beverage to pass through but block all or substantially all flavor-containing materials in the container, and a second surface in communication with a beverage outlet from which the liquid extraction or beverage may be poured or drunk;

a cling-on chamber for maintaining said body in its mounted position when the container is tilted to generate a liquid head to drive the liquid extraction or beverage out of the container through said filtration openings, said cling-on chamber comprising an upper chamber wall, a lower chamber wall and a chamber opening between said upper and lower chamber walls, said upper and lower chamber walls being adapted to cling on to the interior surface of the container; and a step of adding flavor-containing materials to the container, a step of adding liquid to the container, a step of pushing said body downwards into the container, which squeezes an amount of air out of said cling-on chamber, a step of releasing said body, which causes a vacuum formed in said cling-on chamber to generate a suction force between said cling-on chamber and the interior surface of the container, and a step of tilting the container to generate a liquid head to drive the beverage in the container through the filtration openings.

35. A device for making beverage from flavor-containing materials comprising:

a body connected or for connecting to a container, which container is adapted to receive flavor-containing materials and an amount of liquid and to allow the extraction of the flavor-containing materials by liquid to produce a liquid extraction or beverage;

a porous filter connected to said body, said porous filter comprising a first surface adapted to face or contact the flavor-containing materials and liquid in the container, a plurality of filtration openings adapted to allow the liquid extraction or beverage to pass through while blocking all or substantially all flavor-containing materials in the container and a second surface in communication with a beverage outlet from which the liquid extraction or beverage may be poured or drunk, said porous filter and said body being configured to allow the container to be tilted to generate a liquid head to drive the liquid extraction or beverage out of the container through said filtration openings;

a flow facilitator for increasing the flow rate of the liquid extraction or beverage through said filtration openings, said flow facilitator comprising a selective opening adapted to allow air to enter the container to prevent the formation of vacuum therein but prevent or restrict the flavor-containing materials from getting out of the container in the event that the flavor-containing materials and liquid covers or reaches said facilitator, thereby ensuring that the beverage out of the container is always free or substantially free of the flavor-containing materials; and a dip-in filtration chamber adapted to be substantially below the top surface of the liquid extraction or beverage in the container for causing the liquid extraction or beverage to be filtered into said dip-in filtration chamber through said porous filter even before the container is tilted to generate the liquid head, thereby making an amount of beverage quickly available for drinking.

36. A device for making beverage from flavor-containing materials comprising:

a body for connecting or connected to a container, which container is adapted to receive flavor-containing materials and an amount of liquid and to allow the extraction of the flavor-containing materials by liquid to produce a liquid extraction or beverage;

a porous filter connected to said body, said porous filter comprising a first surface adapted to face or contact the flavor-containing materials and liquid in the container, a plurality of filtration openings adapted to allow the liquid extraction or beverage to pass through while blocking all or substantially all flavor-containing materials in the container and a second surface in communication with a beverage outlet from which the liquid extraction or beverage may be poured or drunk, said porous filter and said body being configured to allow the container to be tilted to generate a liquid head to drive the liquid extraction or beverage out of the container through said filtration openings; and a flow facilitator comprising a plurality of selective openings formed in the peripheral side wall of said body for increasing the flow rate of the liquid extraction or beverage through said filtration openings, said plurality of selective openings being adapted to contact the flavor-containing materials and liquid extraction in the container and being sufficiently small to prevent or restricting the flavor-containing materials from getting out of the container in the event that the flavor-containing materials and liquid reaches or covers said facilitator and being sufficiently large to allow air to push liquid out of said selective openings and to enter the container, said plurality of selective openings being positioned around said peripheral side wall of said body and being spaced apart according to a predetermined pattern so that no matter which direction the container is tilted toward for generating said liquid head, at least one of said plurality of selective openings is above the liquid extraction or beverage in the container to allow air to enter the container.

37. A device for making beverage from flavor-containing materials comprising:

a body removably mountable to a container, which container is adapted to receive an amount of flavor-containing materials and liquid and to allow the formation of a dispersion of flavor-containing materials in liquid and the extraction of the flavor-containing materials by liquid to produce a liquid extraction or beverage;

a porous filter connected to said body, said porous filter comprising a first surface adapted to face or contact the dispersion in the container, a plurality of filtration openings adapted to allow the liquid extraction or beverage in the dispersion to pass through while blocking all or substantially all flavor-containing materials in the container, and a second surface in communication with a beverage outlet from which the liquid extraction or beverage may be poured or drunk, said porous filter and body being configured to allow the container to be tilted to generate a liquid head to drive the liquid extraction or beverage out of the container through said filtration openings; and a stirring rod for stirring the mixture of the flavor-containing materials and liquid in the container, said stirring rod having a top end connected to said body, a bottom end adapted to extend into the bottom part of the container, and a predetermined length of bare and slender rod between said ends, said predetermined length of bare rod being sufficiently long to cause said second end to be sufficiently away from said porous filter and comprising no attachment that may limit the movement of said predetermined length of bare rod within the container, thereby enabling a user to hold said body or a handle of said body to move said stirring rod freely in circular and horizontal motions within the container to stir the mixture of the liquid and flavor-containing materials therein prior to mounting said body to the container.

38. Device as defined in claim 37 further comprising a stirring plate member connected to said second end of said stirring rod, said stirring plate member being sufficiently small to allow a sufficiently large gap between the edge of said stirring plate member and at least the upper part of the side wall of the container, thereby enabling said stirring rod and said stirring plate member to move freely in the container to stir the mixture of the liquid and flavor-containing materials therein prior to mounting said body to the container.

39. Device as defined in claim 38 wherein said stirring plate member has a plurality of sufficiently large openings adapted to allow the flavor-containing materials such as coffee grounds to readily pass through and to subsequently fall to the bottom of the container, said stirring plate being dimensioned to restrict the flavor-containing materials on the bottom of the container from reaching said porous filter.

* * * * *